Sept. 30, 1924.  
O. E. PERKINS  
1,510,191  
ATTACHMENT FOR MILK BOTTLE CASES  
Filed July 6, 1923
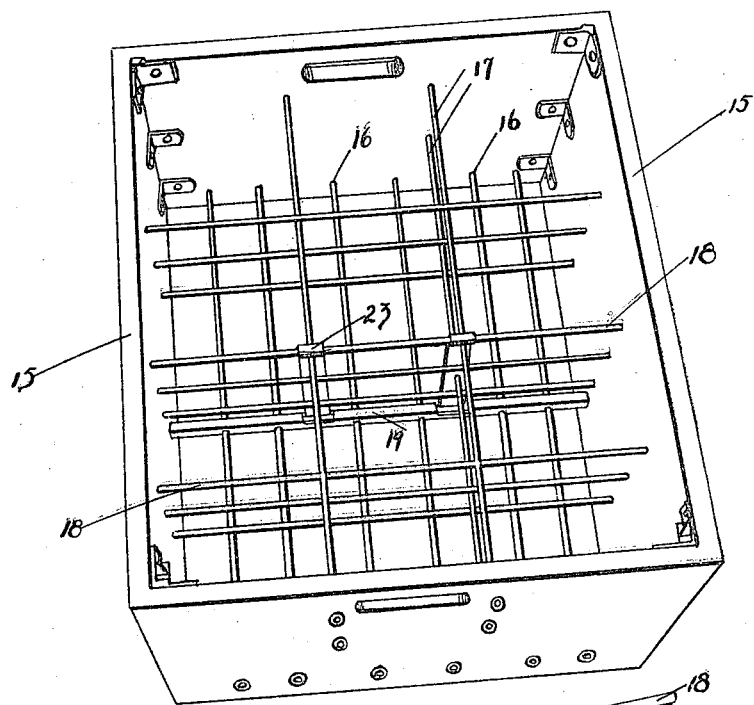
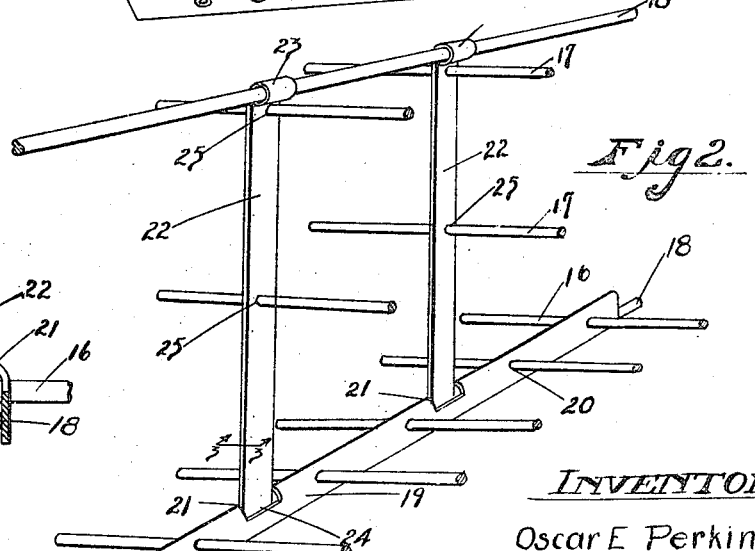
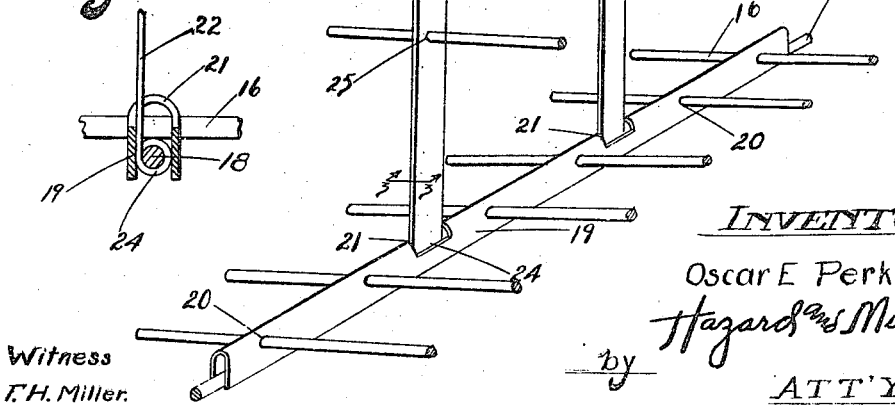
Witness  
F. H. Miller.
INVENTOR  
Oscar E. Perkins.  
by Hazard and Miller  
ATT'YS.

Patented Sept. 30, 1924.

1,510,191

UNITED STATES PATENT OFFICE.

OSCAR E. PERKINS, OF SANTA ANA, CALIFORNIA, ASSIGNOR TO ORANGE COUNTY BY PRODUCTS CO., OF SANTA ANA, CALIFORNIA.

ATTACHMENT FOR MILK-BOTTLE CASES.

Application filed July 6, 1923. Serial No. 649,865.

*To all whom it may concern:*

Be it known that I, OSCAR E. PERKINS, a citizen of the United States, residing at Santa Ana, in the county of Orange and State of California, have invented new and useful Improvements in Attachments for Milk-Bottle Cases, of which the following is a specification.

My invention relates to milk bottle cases of that character having rods or wires arranged in intersecting relation to provide compartments for the reception of bottles.

It is a purpose of my invention to provide an attachment for cases of the above described character by means of which the rods or wires forming the compartments are thoroughly reinforced and securely held against spreading.

Although I have herein shown and will describe only one form of attachment for milk bottle cases embodying my invention, it is to be understood that various changes and modifications may be made therein without departing from the spirit of the invention and the spirit and scope of the appended claims.

In the accompanying drawings,

Fig. 1 is a view showing in perspective a conventional form of milk bottle case having applied thereto one form of attachment embodying my invention.

Fig. 2 is a fragmentary perspective view of the wires or rods forming the compartments of the case shown in Fig. 1, with the attachment embodying my invention applied thereto.

Fig. 3 is a vertical sectional view taken on the line 3—3 of Fig. 2.

Referring specifically to the drawings and particularly to Fig. 1, I have here shown a milk bottle case including a frame 15 in which are secured wires or rods 16, 17 and 18. The rods 16 form the bottom of the compartments, while the intersecting rods 17 and 18 cooperate with each other and with the frame 15 in forming the sides of the compartments.

The attachment forming the subject matter of my invention comprises a strip 19 of metal or other suitable material bent longitudinally so that its transverse contour is in the form of a U. The parallel portions of this strip 19 are formed at regular intervals with openings 20, while the intermediate or curved portion of the strip is provided with two or more slots 21 provided for the purpose of receiving the lower ends of vertical strips 22. The strips 22 are likewise formed of metal or other suitable material and have their opposite ends bent upon themselves to provide sleeves 23 and 24. Openings 25 are formed in the strips 22 at the points shown in Fig. 2.

In the applied position of the attachment shown in Figs. 1 and 2, the strip 19 receives the lowermost rod 18 of the central group of the rods, while the openings 20 have extended therethrough the bottom horizontal rods 16. The slots 21 of the strip 19 expose portions of the rod 18 so as to permit of the attaching of the lower ends of the strips 22 thereto. It will be understood that the sleeves 24 embrace the exposed portion of the rod 18 so that a rigid connection between the strips and the rod is provided. The sleeves 23 receive the uppermost rod 18, while the openings 25 have extended therethrough the intersecting rods 17.

By associating the attachment with the rods in the manner just descerbed, it will be manifest that the several strips serve to thoroughly reinforce the rods against sagging and to prevent spreading thereof.

What I claim is:

1. An attachment for bottle cases comprising a strip of U-shape in cross section, said strip being provided at intervals with openings and slots, strips arranged at an angle with respect to the first strip and having their opposite ends bent to form sleeves, the sleeves on one end of the strips being disposed within said slots.

2. In combination, a bottle case including rods arranged in intersecting relation to provide compartments, a U-shaped strip of rigid material adapted to receive one of the lowermost rods, said strip being formed with openings to receive the lowermost intersecting rods, and provided with slots for exposing portions of the first rod, vertical strips having their opposite ends bent to form sleeves, with the lower sleeves disposed within said strip and embracing said rod, the upper sleeves embracing one of the uppermost rods, and openings formed in said strips through which intermediate rods are adapted to extend.

3. In combination, a bottle case including rods arranged in intersecting relation to provide compartments, a U-shaped strip of rigid material adapted to receive one of the lowermost rods, said strip being formed with openings to receive the lowermost intersecting rods, and provided with slots for exposing portions of the first rod, and vertical strips having their opposite ends bent to form sleeves, with the lower sleeves disposed within said strip and embracing said rod, the upper sleeves embracing one of the uppermost rods.

In testimony whereof I have signed my name to this specification.

OSCAR E. PERKINS